(12) United States Patent
Cayford

(10) Patent No.: US 7,669,650 B2
(45) Date of Patent: Mar. 2, 2010

(54) STUFFING BOX FOR ROTATING ROD

(75) Inventor: Bill Cayford, Lloydminster (CA)

(73) Assignee: Amik Oilfield Equipment & Rentals Ltd., Lloydminster (CA)

( * ) Notice: Subject to any disclaimer, the term of this patent is extended or adjusted under 35 U.S.C. 154(b) by 19 days.

(21) Appl. No.: 11/946,759

(22) Filed: Nov. 28, 2007

(65) Prior Publication Data
US 2008/0122186 A1    May 29, 2008

(30) Foreign Application Priority Data
Nov. 29, 2006    (CA)    .................................... 2568921

(51) Int. Cl.
*E21B 33/03*    (2006.01)
(52) U.S. Cl. .................... 166/84.4; 166/84.1; 166/88.4; 166/68.5
(58) Field of Classification Search ................ 166/78.1, 166/84.1, 88.4, 84.4, 84.5, 68.5
See application file for complete search history.

(56) References Cited

U.S. PATENT DOCUMENTS

| | | |
|---|---|---|
| 4,047,858 A | 9/1977 | Zalis |
| 5,791,411 A * | 8/1998 | Ricalton et al. ............. 166/84.1 |
| 2008/0122182 A1 * | 5/2008 | Parker et al. ................ 277/329 |

* cited by examiner

*Primary Examiner*—Giovanna C Wright
(74) *Attorney, Agent, or Firm*—Christensen O'Connor Johnson Kindness PLLC

(57) ABSTRACT

A stuffing box for a rotating rod includes a stationary housing and a tubular rotating inner housing. The stationary outer housing has an upper end, a lower end, an exterior surface and an inner surface defining an interior cavity. The inner housing is positioned within the interior cavity of the outer housing. The inner housing has an upper end, a lower end, an exterior surface and an inner surface defining an interior bore adapted to accommodate a rod. Bearings are disposed between the outer housing and the inner housing to facilitate rotation of the inner housing. An inner seal assembly provides a seal that prevents the migration of fluids between the inner housing and the rod. An outer seal assembly provides a seal that prevents the migration of fluids between the inner housing and the outer housing.

9 Claims, 3 Drawing Sheets

STUFFING BOX FOR ROTATING ROD

FIELD

The present application relates to a stuffing box and, in particular, a stuffing box for use with a rotating rod.

BACKGROUND

Stuffing boxes are commonly used to keep fluids from escaping, in such applications as rod pumps used to pump fluids from a well. Packing is used to create a seal between the stuffing box housing and a rod that is either rotated or reciprocated. An adjustable pressure member is used to exert a compressive force upon the packing to keep the packing in sealing contact. Eventually, the packing wears to such an extent that the compressive force of the pressure member no longer maintains sealing contact and the packing must be replaced.

SUMMARY

There is provided a stuffing box for a rotating rod which includes a stationary housing and a tubular rotating inner housing. The stationary outer housing has an upper end, a lower end, an exterior surface and an inner surface defining an interior cavity. The inner housing is positioned within the interior cavity of the outer housing. The inner housing has an upper end, a lower end, an exterior surface and an inner surface defining an interior bore adapted to accommodate a rod. Bearing means are disposed between the outer housing and the inner housing to facilitate rotation of the inner housing. An inner seal assembly provides a seal that prevents the migration of fluids between the inner housing and the rod. An outer seal assembly provides a seal that prevents the migration of fluids between the inner housing and the outer housing.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
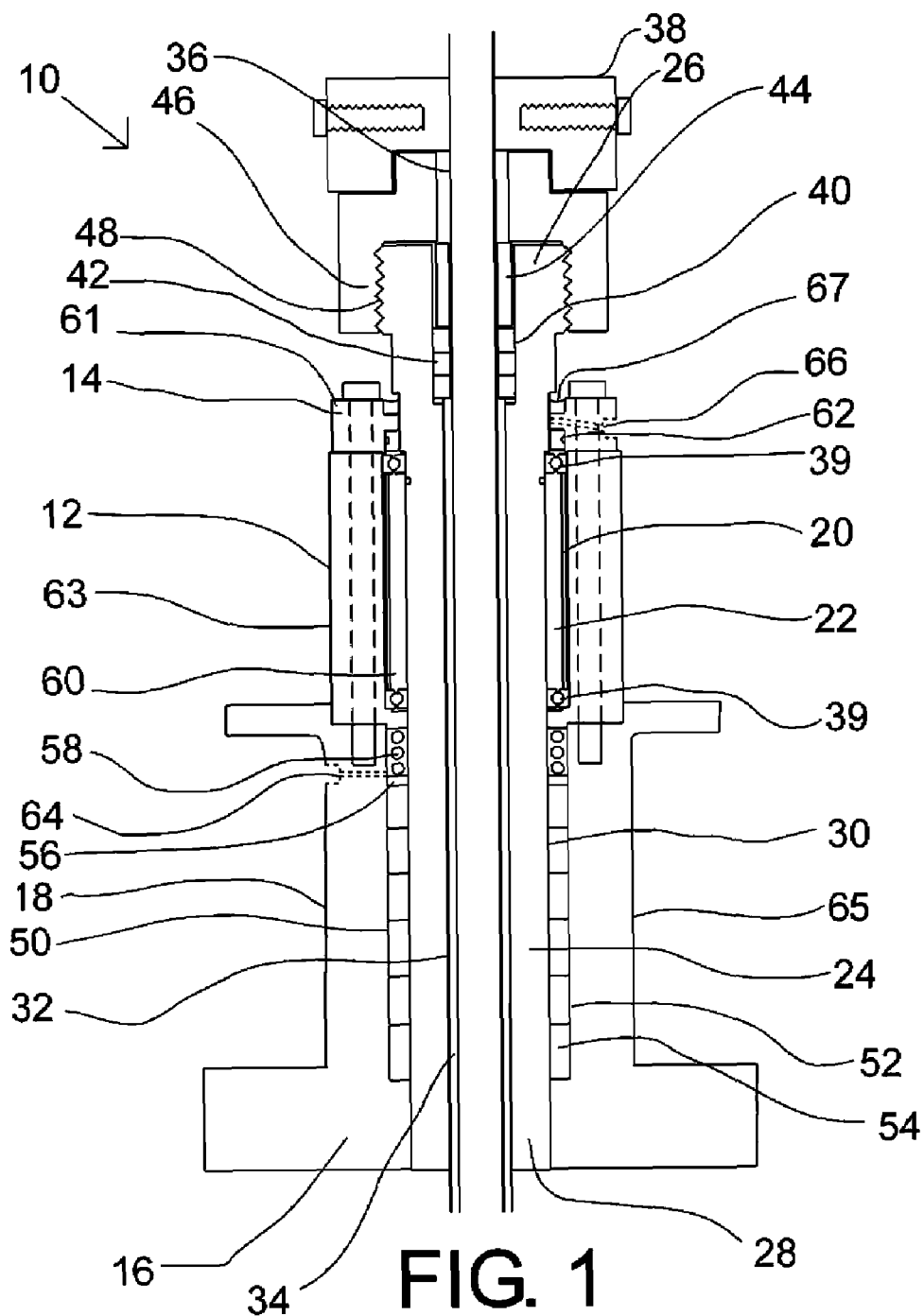
FIG. 1 is a side view in section of the stuffing box for a rotating rod.

A stuffing box for a rotating rod generally identified by reference numeral 10, will now be described with reference to FIGS. 1 and 2.

Structure and Relationship of Parts:

Referring to FIG. 1, stuffing box 10 includes a stationary outer housing 12 having an upper end 14, a lower end 16, an exterior surface 18 and an inner surface 20 defining an interior cavity 22. A tubular rotating inner housing 24 is positioned within interior cavity 22 of outer housing 12. Inner housing 24 has an upper end 26, a lower end 28, an exterior surface 30 and an inner surface 32 defining an interior bore 34. Interior bore 34 is adapted to accommodate a rod 36. A rod clamp 38 is positioned at upper end 26 of inner housing 24. Rod clamp 38 securely clamps onto rod 36 and maintains its axial position relative to inner housing 24. The positioning of rod clamp 38 also causes inner housing 24 to rotate with rod 36. Two sets of bearings 39 are disposed between outer housing 12 and inner housing 24 to facilitate rotation of inner housing 24. A packing gland 40 is provided in inner surface 32 of inner housing 24. Packing gland 40 is adapted to receive packing 42. A pressure member 44 is provided that acts upon packing 42. A threaded annular end cap 46 engages threads 48 at upper end 26 of inner housing 24 and exerts a force upon pressure member 44, such that as end cap 46 is tightened, pressure member 44 exerts a compressive force upon packing 42 within packing gland 40. This in turn causes packing 42 to engage both rod 36 and inner surface 32 of inner housing 24, to provide form a seal that prevents the migration of fluids between inner housing 24 and rod 36. An outer seal assembly 50 provides a seal that prevents the migration of fluids between inner housing 24 and outer housing 12. Outer seal assembly 50 includes a packing gland 52 in inner surface 20 of outer housing 12 that is adapted to receive packing 54 and a pressure member 56. Pressure member 56, which is biased by a spring 58, exerts a compressive force upon packing 54 within packing gland 52 to cause packing 54 to engage both exterior surface 30 of inner housing 24 and inner surface 20 of outer housing 12 to provide form a seal that prevents the migration of fluids between inner surface 20 of outer housing 12 and exterior surface 30 of inner housing 24.

Bearings 39 are in a sealed bearing chamber 60 that is filled with hydraulic fluid. Bearing chamber 60 is disposed between outer seal assembly 50 and a chamber seal 62 positioned at upper end 14 of outer housing 12. As shown, outer housing 12 is made up of three parts: a top seal cap 61 that seals the top of bearing chamber 60, a bearing housing 63, and a lower housing 65 that attaches to a wellhead (shown in FIG. 2) and houses packing 54. Bearing chamber 60 is then filled with hydraulic fluid to lubricate and cool bearings 39, but also to prevent the migration of downhole fluids under pressure past inner housing 24 and outer housing 12. This is done by causing hydraulic fluid to bias pressure member 56 against packing 54. This may also be done by providing hydraulic fluid at a pressure equivalent or greater than the pressure of the downhole fluids. Bearing chamber 60 is filled with hydraulic fluid by a hydraulic circulation port 64 which is shown positioned toward lower end 16 of outer housing 12. Another circulation port 66 is provided on a sheltered side of chamber seal 62 opposite to bearing chamber 60. A low pressure seal 67 is positioned opposite circulation port 66 to shelter circulation port 66, and to ensure fluid only exits through circulation port 66. Chamber seal 62 is designed to purposefully allow a portion of the hydraulic fluid to leak past to circulation port 64. Hydraulic fluid can then be circulated through bearing chamber 60 to flush and cool bearings 39.

Figure 2:
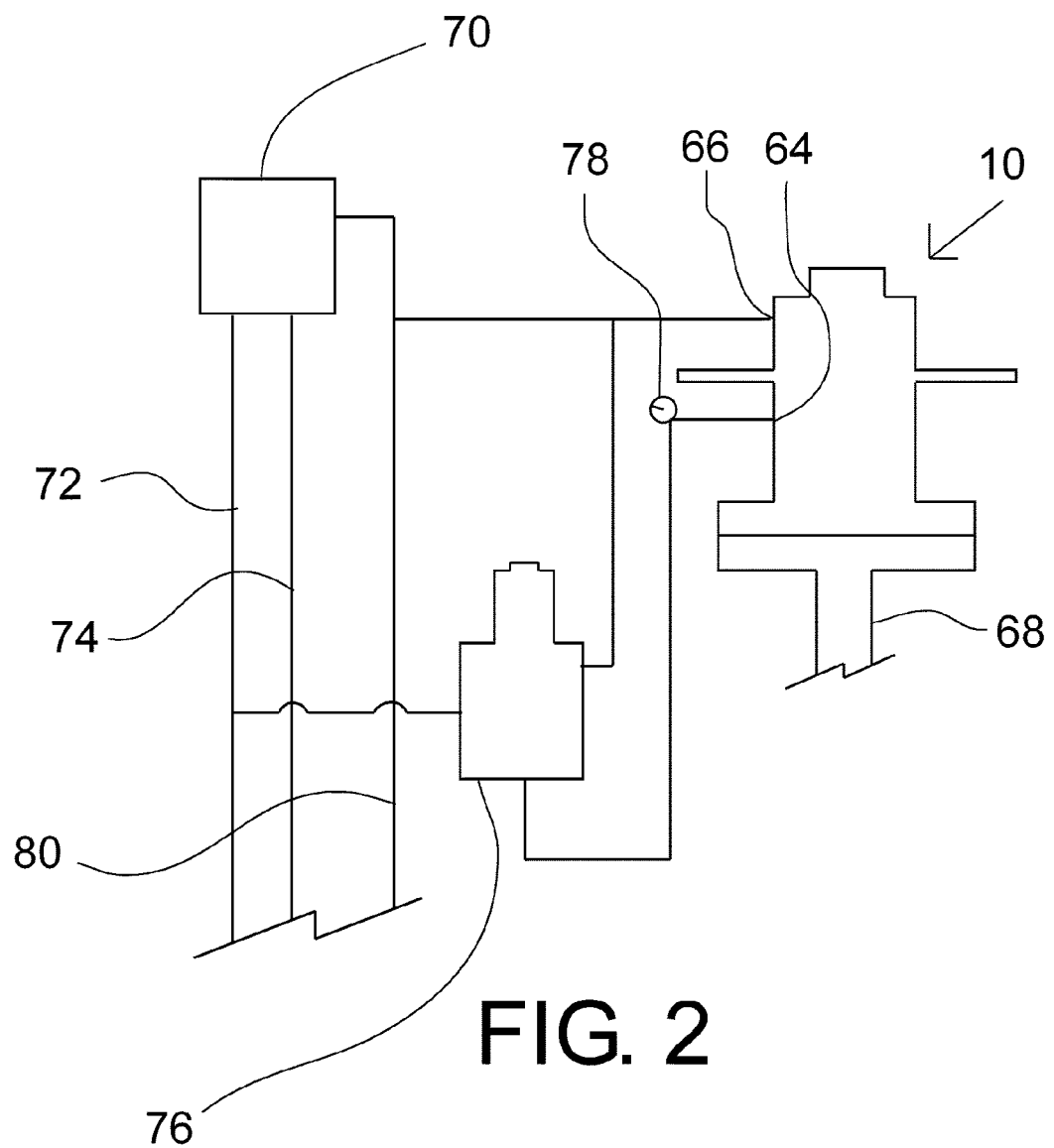
FIG. 2 is a schematic view of a wellhead using the stuffing box.

Referring to FIG. 2, stuffing box 10 is attached to a wellhead 68. A circulation of hydraulic fluid from hydraulic motor 70 is used to provide pressure to stuffing box 10, and in this embodiment, is also used to drive the rotating pump (not shown) through a pressure line 72 and a return line 74. Pressure line 72 is also connected to circulation port 64 through a pressure reducing valve 76. The pressure entering circulation port 64 is read by a pressure gauge 78. Hydraulic fluid that exits through circulation port 66 is directed toward a drain 80.

Operation:

Referring to FIG. 2, stuffing box 10 is attached to a wellhead 68, and connected to a source of hydraulic fluid under pressure, in this case, hydraulic motor 70. Referring to FIG. 1, rod 36 is positioned within interior bore 34 of inner housing 24 and secured against axial movement by rod clamp 38. Threaded annular end cap is used to apply pressure to pressure member 44, which in turn applies pressure to packing 42 within packing gland 40. Packing 42 then engages both inner surface 32 of inner housing 24 and rod 36 to seal inner housing 24 to rod 36 against pressurized fluids from migrating up between the two. As rod 36 rotates, inner housing 24 rotates with it. Inner housing 24 is positioned within interior cavity 22 of outer housing 12. Inner housing 24 rotates within outer housing 12 by means of bearings 39. Bearings 39 are positioned within sealed bearing chamber 60 which is sealed at one end by chamber seal 62, and at the other end by packing 54 within packing gland 52. Hydraulic fluid circulates through bearing chamber 60 by entering circulation port 64 at one end, and leaking past chamber 62 to reach circulation port 66 at the other end of chamber 60, which acts as a drain. Hydraulic fluid is thus able to flush and cool bearings 39. Pressure member 56 is biased by spring 58 and the pressurized hydraulic pressure in bearing chamber 60 to exert a compressive force upon packing 54 within packing gland 52 to cause packing 54 to engage both exterior surface 30 of inner housing 24 and inner surface 20 of outer housing 12. Pressurized fluid from the well is then prevented from migrating between inner housing 24 and outer housing 12.

Variation

Figure 3:
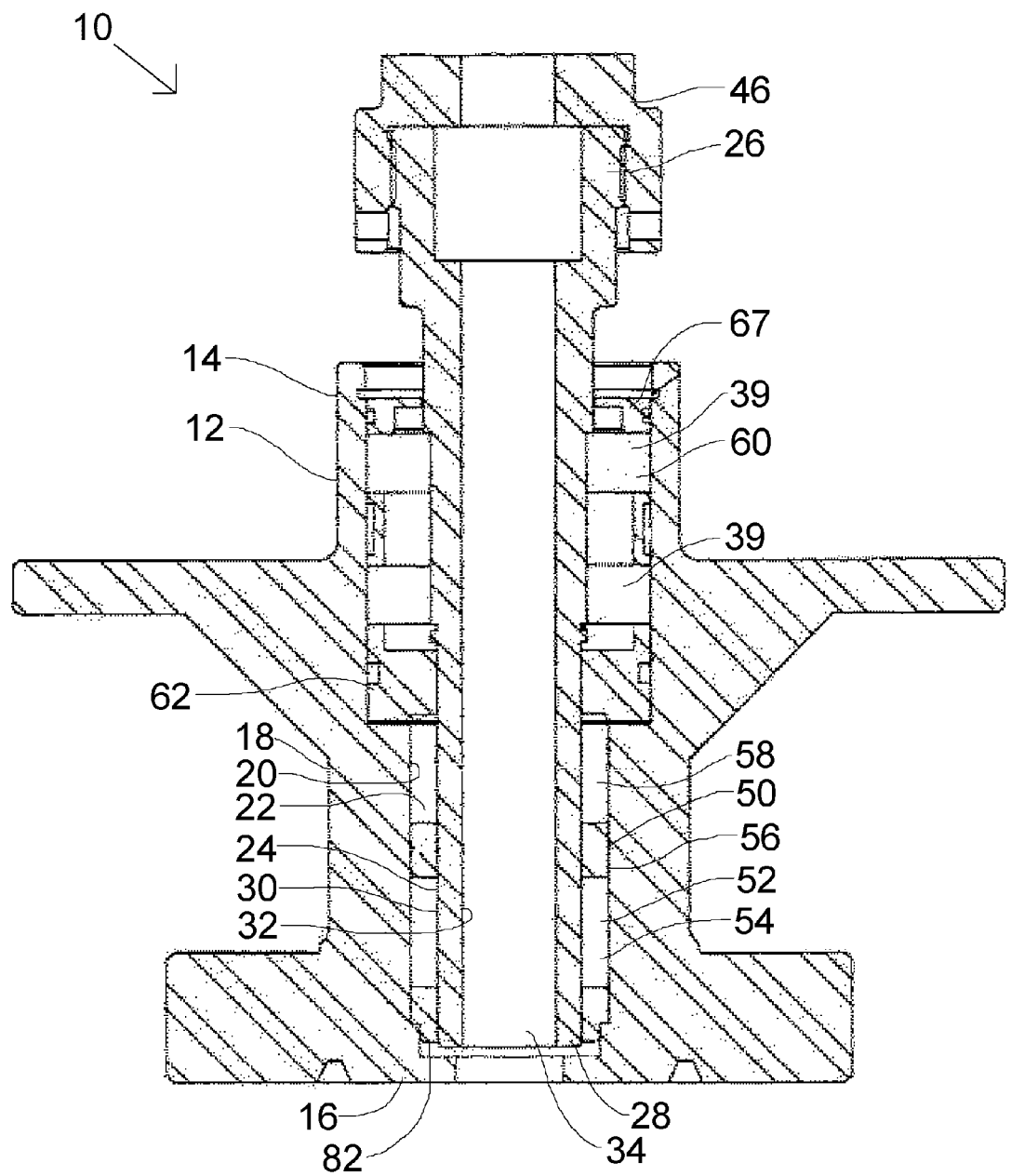
FIG. 3 is a side view in section of an alternative design.

Referring to FIG. 3, an example of a variation of the above design is shown. In this figure, similar reference numbers have been used for convenience. While hydraulic circulation ports 64 and 66 are not shown, they are included in this design.

There are two main differences in this design. The first is that housing 12 is made up of a single portion, rather than more than one as described above. The other difference is that seal 62, which is a high pressure seal, has been repositioned below bearings 39. Low pressure seal 67 is still positioned at upper end 14 of housing 12, and in this situation acts as the chamber seal described above. This means that bearings 39 are now in a low pressure environment, however, this will have little effect on their operation. In addition to these differences, lower end 16 has also been redesigned slightly such that lower end 28 of inner housing 24 is positioned within outer housing 12, and brass ring 82, which is part of packing 54, is positioned against a shoulder in outer housing 12.

These differences are intended primarily to make stuffing box 10 more easy to manufacture and assemble.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope defined in the Claims.

What is claimed is:

1. A stuffing box for a rotating rod, comprising:
   a stationary outer housing having an upper end, a lower end, an exterior surface and an inner surface defining an interior cavity;
   a tubular rotating inner housing positioned within the interior cavity of the outer housing, the inner housing having an upper end, a lower end, an exterior surface and an inner surface defining an interior bore adapted to accommodate a rod;
   bearings disposed between the outer housing and the inner housing in a sealed bearing chamber to facilitate rotation of the inner housing;
   an inner seal assembly providing a seal that prevents the migration of fluids between the inner housing and the rod;
   an outer seal assembly providing a seal that prevents the migration of fluids between the inner housing and the outer housing;
   the sealed bearing chamber being filled with hydraulic fluid and disposed between the outer seal assembly and a chamber seal positioned at the upper end of the outer housing; and
   a circulation port positioned on a sheltered side of the chamber seal opposite to the bearing chamber, the chamber seal purposefully allowing a portion of the hydraulic fluid to leak past the chamber seal to the circulation port.

2. The stuffing box of claim 1, wherein a rod clamp is positioned at the upper end of the inner housing to secure the rod against axial movement.

3. The stuffing box of claim 1, wherein the inner seal assembly includes a packing gland in the inner surface of the inner housing adapted to receive packing and a pressure member adapted to exert a compressive force upon the packing within the packing gland causing the packing to engage both the rod and the inner surface of the inner housing.

4. The stuffing box of claim 3, wherein a threaded annular end cap is provided, the end cap engaging threads at the upper end of the inner housing, such that a tightening of the end cap causes the pressure member to exert a compressive force upon the packing within the packing gland causing the packing to engage both the rod and the inner surface of the inner housing.

5. The stuffing box of claim 1, wherein the outer seal assembly includes a packing gland in the inner surface of the outer housing adapted to receive packing, and a pressure member adapted to exert a compressive force upon the packing within the packing gland causing the packing to engage both the exterior surface of the inner housing and the inner surface of the outer housing.

6. The stuffing box of claim 5, wherein the pressure member is biased by a spring to exert a compressive force upon the packing within the packing gland causing the packing to engage both the exterior surface of the inner housing and the inner surface of the outer housing.

7. The stuffing box of claim 5, wherein the pressure member is biased by hydraulic fluid under pressure to counter fluids migrating under pressure.

8. A stuffing box for a rotating rod, comprising:
   a stationary outer housing having an upper end, a lower end, an exterior surface and an inner surface defining an interior cavity;
   a tubular rotating inner housing positioned within the interior cavity of the outer housing, the inner housing having an upper end, a lower end, an exterior surface and an inner surface defining an interior bore adapted to accommodate a rod;
   a rod clamp being positioned at the upper end of the inner housing to secure the rod against axial movement;
   bearings disposed between the outer housing and the inner housing in a sealed bearing chamber to facilitate rotation of the inner housing;
   an inner seal assembly providing a seal that prevents the migration of fluids between the inner housing and the rod, the inner seal assembly including a packing gland in the inner surface of the inner housing adapted to receive packing and a pressure member, a threaded annular end cap engaging threads at the upper end of the inner housing and exerting a force upon the pressure member, such that a tightening of the end cap causes the pressure member to exert a compressive force upon the packing within the packing gland causing the packing to engage both the rod and the inner surface of the inner housing;

an outer seal assembly providing a seal that prevents the migration of fluids between the inner housing and the outer housing, the outer seal assembly including a packing gland in the inner surface of the outer housing adapted to receive packing, and a pressure member adapted to exert a compressive force upon the packing within the packing gland causing the packing to engage both the exterior surface of the inner housing and the inner surface of the outer housing, the pressure member being biased by a spring to exert a compressive force upon the packing within the packing gland causing the packing to engage both the exterior surface of the inner housing and the inner surface of the outer housing;

the sealed bearing chamber being filled with hydraulic fluid and disposed between the outer seal assembly and a chamber seal positioned at the upper end of the outer housing; and a circulation port positioned on a sheltered side of the chamber seal opposite to the bearing chamber, the chamber seal purposefully allowing a portion of the hydraulic fluid to leak past the chamber seal to the circulation port.

9. The stuffing box of claim 8, wherein the pressure member is biased by hydraulic fluid under pressure to counter fluids migrating under pressure.

* * * * *